US008175897B2

(12) United States Patent
Lee et al.

(10) Patent No.: US 8,175,897 B2
(45) Date of Patent: *May 8, 2012

(54) SCORE BASED DECISIONING (75) Inventors: Walter W. Lee, La Mesa, CA (US);
Daniel Shoham, San Diego, CA (US);
Wesley K. Wilhelm, Spokane, WA (US);
Joseph P. Milana, San Diego, CA (US);
Allen P. Jost, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1350 days.

This patent is subject to a terminal disclaimer.

(21) Appl. No.: 11/738,362

(22) Filed: Apr. 20, 2007

(65) Prior Publication Data

US 2007/0288641 A1 Dec. 13, 2007

Related U.S. Application Data

(63) Continuation of application No. 09/675,992, filed on Sep. 29, 2000, now Pat. No. 7,251,624, which is a continuation-in-part of application No. 09/167,102, filed on Oct. 5, 1998, now Pat. No. 6,330,546, which is a continuation of application No. 07/941,971, filed on Sep. 8, 1992, now Pat. No. 5,819,226.

(60) Provisional application No. 60/195,156, filed on Apr. 6, 2000.

(51) Int. Cl.
*G06Q 40/00* (2006.01)

(52) U.S. Cl. ................................ 705/4; 705/26; 706/21
(58) Field of Classification Search .................... 705/26; 706/21
See application file for complete search history.

(56) References Cited

U.S. PATENT DOCUMENTS

| 4,812,628 A * | 3/1989 | Boston et al. ............... 235/380 |
| 6,282,658 B2 * | 8/2001 | French et al. ................... 726/7 |

OTHER PUBLICATIONS

Jobber, D. and Saunders, J. "The Prediction of Industrial Mail-survey Response Rates," Oct. 1989, Operational Research Society, vol. 40, No. 10, 839-847.*

* cited by examiner

*Primary Examiner* — Lena Najarian
(74) *Attorney, Agent, or Firm* — Mintz, Levin, Cohn, Ferris, Glovsky and Popeo, P.C.

(57) ABSTRACT

The invention aids an entity operating on the Internet or on another network to selectively request additional data about a user who has made a request for an interaction with the entity. The invention helps an entity to determine when and how to request additional data so as to reduce the likelihood of causing the user to have an adverse reaction, e.g., terminate the interaction. One embodiment of the invention concerns customers requesting transactions with on-line merchants. More specifically, this embodiment aids merchants by detecting Internet credit card transactions that are likely to be fraudulent, and providing the merchants with mechanisms for managing a suspected transaction as it occurs to obtain additional information that can be useful to reducing the likelihood of fraud.

19 Claims, 9 Drawing Sheets

SCORE BASED DECISIONING

CROSS-REFERENCE TO RELATED APPLICATIONS

This application is a continuation of U.S. application Ser. No. 09/675,992, filed on Sep. 29, 2000 now U.S. Pat. No. 7,251,624, entitled "Score Based Decisioning," incorporated herein in its entirety, which claimed benefit of U.S. application Ser. No. 60/195,156, filed Apr. 6, 2000, entitled "Identification And Management Of Fraudulent Credit/Debit Card Purchases At Merchant Ecommerce Sites," incorporated herein by reference in its entirety, and which is a continuation-in-part of U.S. application Ser. No. 09/167,102, filed on Oct. 5, 1998, entitled "Risk Determination and Management Using Predictive Modeling and Transaction Profiles for Individual Transacting Entities," issued as U.S. Pat. No. 6,330,546, which is incorporated herein in its entirety, which is a continuation of U.S. application Ser. No. 07/941,971, filed on Sep. 8, 1992, entitled "Fraud Detection Using Predictive Modeling," issued as U.S. Pat. No. 5,819,226, which is incorporated herein by reference in its entirety.

BACKGROUND

1. Field of the Invention

This invention relates generally to the processing of a request for an interaction over a computer network. In particular, the invention relates to assisting an entity that operates on the Internet to determine conditions under which to obtain additional information from a user after the user has made a request for an interaction with the entity.

2. Background of the Invention

Companies that conduct business on the Internet face challenges in obtaining enough reliable information about a user to meet the needs of the company without causing the user to have an adverse reaction, e.g., to terminate the interaction. For example, typically an on-line merchant wants to obtain enough information about a potential transaction with a customer to reliably indicate that the customer is not acting fraudulently. However, in doing so, the on-line merchant can cause the potential customer to terminate the transaction, for example, by asking for too much information, or for too personal information.

Credit card purchases of goods and services over the Internet are now common. In a typical transaction, a consumer selects one or more items to purchase, provides information identifying himself, such as his name and address, and provides payment information, e.g., credit card information.

Unfortunately, merchants doing business on the Internet face great exposure to credit card fraud. Stolen cards are used in approximately 1.2% of all Internet sales, causing on-line merchants to claim losses due to credit card fraud of more than $200 million in 1999. Currently, about 0.06% to 0.09% of traditional sales are fraudulent, making on-line transactions more than 10 times as likely to involve fraud as traditional retail transactions. At least three factors make on-line sales more susceptible to fraud than sales made at retail shopping venues. For on-line sales, the buyer does not have to 1) be physically present; 2) hand over a credit card, or 3) sign a receipt. As a consequence, on-line merchants presently suffer a variety of fraud-related costs. These costs include:

1) Loss of Payments & Merchandise

On-line fraud results in large revenue losses for Internet merchants. When an Internet merchant is a victim of fraud, it loses both the payment and the merchandise. In contrast, if a cardholder's card is used fraudulently and the merchant has a signed receipt as record of the transaction, the issuer usually absorbs the fraudulent charges.

With Internet commerce, however, the merchant, not the issuer, absorbs the fraudulent purchases. Regulations created by card issuer associations specify that in card-not-present (CNP) situations, merchants assume the full risk of purchases made by credit card, independent of authorizations made by issuing banks. Because CNP transactions are the standard for e-commerce, the current framework shifts the burden of these losses primarily to the merchants. Indeed, for companies that do all of their business over the Internet based on CNP transactions, this loss exposure can be in the tens of millions of dollars.

Beyond use of a stolen credit card or of a fabricated card number, other types of fraud frequently occur in the context of on-line purchasing. Customers more easily dispute valid charges related to on-line purchases as opposed to valid charges related to traditional retail purchases. For example, a husband may make charges to an on-line merchant and deny them to his wife. The wife, in turn, may then call the card issuer and dispute the on-line merchant's bill. Though these charges are valid, the card company may decide in favor of their customer, and the merchant becomes responsible for the chargebacks. A chargeback is a charge levied on a merchant for the amount of a purchase that was charged on a credit card and that the credit card holder successfully disputes. In addition to chargebacks, merchants are responsible for loss from disputed charges when customers claim non-receipt of goods, non-arrival of goods due to incorrect shipping addresses, or goods refused on delivery.

2) Loss from Shipping Charges

The charges for shipping goods are normally paid by consumers. When on-line fraud occurs, however, the on-line merchant must cover the cost of shipping.

3) Loss from Human Intervention

Presently, an on-line merchant can attempt to use parameter-based rules and negative files to determine credit card fraud. Parameter based rules use if/then logic to attempt to identify aberrant behavior based on specific data such as negative file information. Negative files are database files that track negative customer behavior. One can access the negative file database using a key, such as credit card number, or Social Security number. However, using parameter-based rules and negative files often leads to time-consuming fraud investigations. The fraud investigations, in turn, lead to rising administrative costs as a result of the need to increase staff to perform the investigations.

4) Loss of Valued Customers

Poorly managed fraud-control systems can lead to decreased customer satisfaction resulting in lost revenues to retailers. Many on-line retailers burden their customers with lengthy and complex on-line order forms in an attempt to minimize fraud. However, these lengthy forms frustrate and confuse customers potentially reducing the customer's good will toward the retailer. A frustrated and/or confused customer often either abandons their order of defaults to a competitor when initiating a transaction in the future. In the same vein, legitimate customers become insulted when inaccurate fraud control rules reject their orders. Such customers often permanently migrate to other vendors where they find better treatment Merchants then spend valuable marketing dollars attempting to replace the customers lost as a result of poorly managed fraud-control systems.

5) Loss from Chargeback Fees

As noted above, a chargeback is a charge levied on a merchant for the amount of a purchase that has previously been charged to a payment card, and that has been successfully disputed by a customer. When a chargeback is processed, the merchant typically pays a fee of $15.00 to $25.00. If the merchant disputes the chargeback and wants to re-present, or re-issue, the charge, an equivalent fee is billed to the merchant. If the card issuer again decides in favor of the customer and processes a second chargeback, the merchant is charged yet another fee, and this time the charge cannot be re-presented. The merchant can, however, arbitrate the charge, whereupon the issuing bank can charge an up-front, non-refundable fee of up to $50.00. Thus, for low cost items (e.g., books, clothes, etc.) merchants simply absorb the loss rather than pay the higher chargeback fees.

6) Loss from Chargeback Fines

In addition to paying a fee for each chargeback, issuing banks can levy fines on merchants having too many chargebacks. Typically 1.5-3.0% of the merchant's chargeback volume, such fines can range from a few hundred dollars per month, to $10,000 or even $100,000 per month, with fines escalating higher as chargebacks continue unabated.

7) Loss of Credit Card Privileges

The reputations of credit card brands are damaged when legitimate customers are victimized by fraud, even if they do not absorb the actual financial losses. Rules are thus instituted by the credit card brands to prevent merchants from allowing too many fraudulent transactions to occur. If fraudulent transactions exceed a specified small percentage of a merchant's overall credit-card sales, the merchant can lose the privilege of receiving payment through a credit card issuer altogether. Obviously, the ability to accept credit cards for payment is extremely important to an on-line merchant. Thus, as noted above, out of fear of losing the privilege of accepting credit cards for payment, on-line merchants are responding with generalized, lengthy and complex on-line order forms in an attempt to reduce fraud. These burdensome forms cause the loss of customers. Those on-line merchants that can solve the problem of fraud without using generalized, burdensome order forms stand to gain significant market share.

8) Limitations of Most Fraud-Risk Solutions

On-line retailers have been implementing a range of fraud detection and reduction techniques to combat the problems described above. Typical solutions that on-line merchants have deployed include the use or rule sets and basic checks such as address verification.

a) Rule Sets

Rule sets use if/then logic to attempt to identify aberrant behavior using specified data such as negative file information. A typical rule might read: "IF the transaction amount is over $1000 and the ship-to address is outside North America THEN decline the transaction". Rule-based fraud detection and reduction methods by themselves are limited because they:

Fail to detect an unacceptably large amount of fraud

Result in high false-positive rates (a false-positive result occurs when a fraud detection method flags a valid transaction as potentially fraudulent)

Create a high volume of cases requiring human intervention to investigate transactions identified as potentially fraudulent Are slow to adapt to new methods of committing fraud, requiring new rules to identify the fraud b) Address Verification Service (AVS)

AVS attempts to verify that the billing address for a credit card presented by a customer is the same as the customer's address. For example, a customer may provide her address and zip code to a merchant. The merchant then transfers at least part of the address and zip code data along with the credit card number to a server for approval. The server compares the zip code and billing address data with the physical address to which a cardholder's credit card is registered. Once the server compares this information, the server sends the merchant a response to the AVS request indicating the result of the comparison.

AVS was designed for mail and telephone orders and many on-line merchants presently use AVS. However, AVS has no international fraud detection capability, is not designed for on-line transactions, and is available only for certain credit cards. Furthermore, there are many legitimate instances when the shipping address and billing address are different. Such instances include the purchase of a gift using a personal credit card to ship goods to a work address and vice versa or when there is no shipping address at all. There may be no shipping address when companies deliver the purchased goods or services electronically. Items that companies can deliver electronically include software, reference material, subscriptions to an on-line service, and digital images.

9) Other Problems Associated with Obtaining Information from a Customer

As noted above, companies face challenges in obtaining enough reliable information about a customer to meet the needs of the company without causing the customer to have an adverse reaction. A variety of companies in addition to on-line merchants face these challenges. In-bound call centers, e.g., customer service centers or catalog ordering phone centers, as well as out-bound call centers, e.g., telemarketing operations, attempt to obtain information from a customer without causing the customer to have an adverse reaction.

A customer can have a variety of adverse reactions. The customer may terminate her interaction with the merchant or provide false and/or incomplete information to the merchant In addition, the merchant can lose the customer's goodwill; if a customer faces lengthy, confusing, or inconvenient forms or questions when interacting with the merchant, the customer may default to a competitor of the merchant when initiating transactions in the future.

An entity may collect information from a user for a variety of reasons distinct from preventing fraud. These reasons can include gathering information for marketing or for research. Companies often use registration forms for such purposes. Completion of the registration form is often a prerequisite for gaining access to portions of a site or to desirable content. Such companies do not want to cause the customer to terminate her interaction with the company, provide false or incomplete information, or lose good will toward the company. Thus, there exists a need for a way of determining the conditions under which to request information from users so as to foster the entity/user interaction.

SUMMARY OF INVENTION

The invention aids an entity to determine the conditions under which to request additional information about a user during an entity/user interaction to meet the needs of the entity, while reducing the risk that a user will have an adverse reaction, such as terminating the interaction. As one example, the invention aids Internet merchants by detecting credit card transactions that are likely to be fraudulent, and providing the merchants with mechanisms for selectively requesting additional information from the user that may reduce the likelihood of fraud, and for managing a suspected transaction as it occurs.

According to one embodiment of the invention, relevant information about a user's requested transaction with a merchant, such as identifying information about the buyer and the amount of the transaction, is evaluated (scored) to determine the likelihood that the transaction is fraudulent. Depending on the score, the merchant may fulfill the order, decline the order, or request more information. Instead of being scored for fraud, the transaction may be scored with respect to any other factor that a merchant deems useful to know when deciding whether or not to complete the transaction.

The additional information that may be requested is typically useful in determining whether or not the transaction should be completed. In determining what information to request from the buyer, one embodiment calculates metrics for the value of additional data provided by one or more proposed follow-up question sets.

In addition, a friction model determines the respective attrition costs of each proposed follow-up questions set. An attrition cost is a measure of the likelihood that presenting a question set to a user will cause that user to terminate the interaction.

In a preferred embodiment, an information value prediction model calculates metrics for the value of additional data provided by specified question sets derived from question set data. Similarly, a friction prediction model calculates attrition costs for specified question sets derived from question set data.

Based on the metrics for the value of the additional data and the attrition costs, an optimization module determines the expected value of fulfillment of the transaction for specified question sets, and chooses a question set with a high expected value of fulfillment. In a preferred embodiment, the expected value of fulfillment is a function of the probability of non-attrited fulfillment. Furthermore, the expected value of fulfillment can be a function of the monetary value of the transaction.

Credit card transactions are only one application of the invention. The invention can apply to other situations in which an entity wants to selectively obtain information from its users while fostering the entity/user interaction. Thus, one version of the invention provides a computer-implemented method for processing a request for an interaction. The method includes: (a) receiving a request for an interaction from a user, the request including a first set of interaction data for variables descriptive of the interaction; (b) determining a value of the interaction based on the first set of interaction data; and (c) responsive to the value of the interaction, selectively obtaining additional data from the user. The invention may also be used for other types of transactions, such as questionnaires, surveys, and other information gathering interactions. Likewise, even for purchase transactions, the invention is not limited to usage with credit cards, but can be used with other forms or types of payment as well.

The invention contemplates entity/user interactions where communication with the user can occur over media other than a computer network or through a customer service representative. Thus, communication with the user can occur through a variety of modes including network-facilitated, telephone-facilitated, or in-person communication. For example, the user can call into a call center, e.g., a customer service center or a phone center for ordering from a catalog. Alternatively, the entity can contact the user through an out-bound call center, e.g., a telemarketing operation. In either case, the operators or voice response units can operate from a script that guides them as to what questions to ask and when. The script can be devised as described herein.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The invention aids an entity to selectively request additional data about a user to serve the needs of the entity without causing the user to have an adverse reaction. Adverse reactions include terminating the interaction, providing false or incomplete responses, and losing good will for, or developing ill will for, the entity. One embodiment of the invention concerns customers requesting transactions with on-line merchants. More specifically, this embodiment aids a merchant by detecting Internet credit card transactions that are likely to be fraudulent. This embodiment then provides the merchant with mechanisms for managing a suspected transaction as it occurs by selectively obtaining additional information that can be useful in refining the estimation of the likelihood of fraud.

Figure 1:
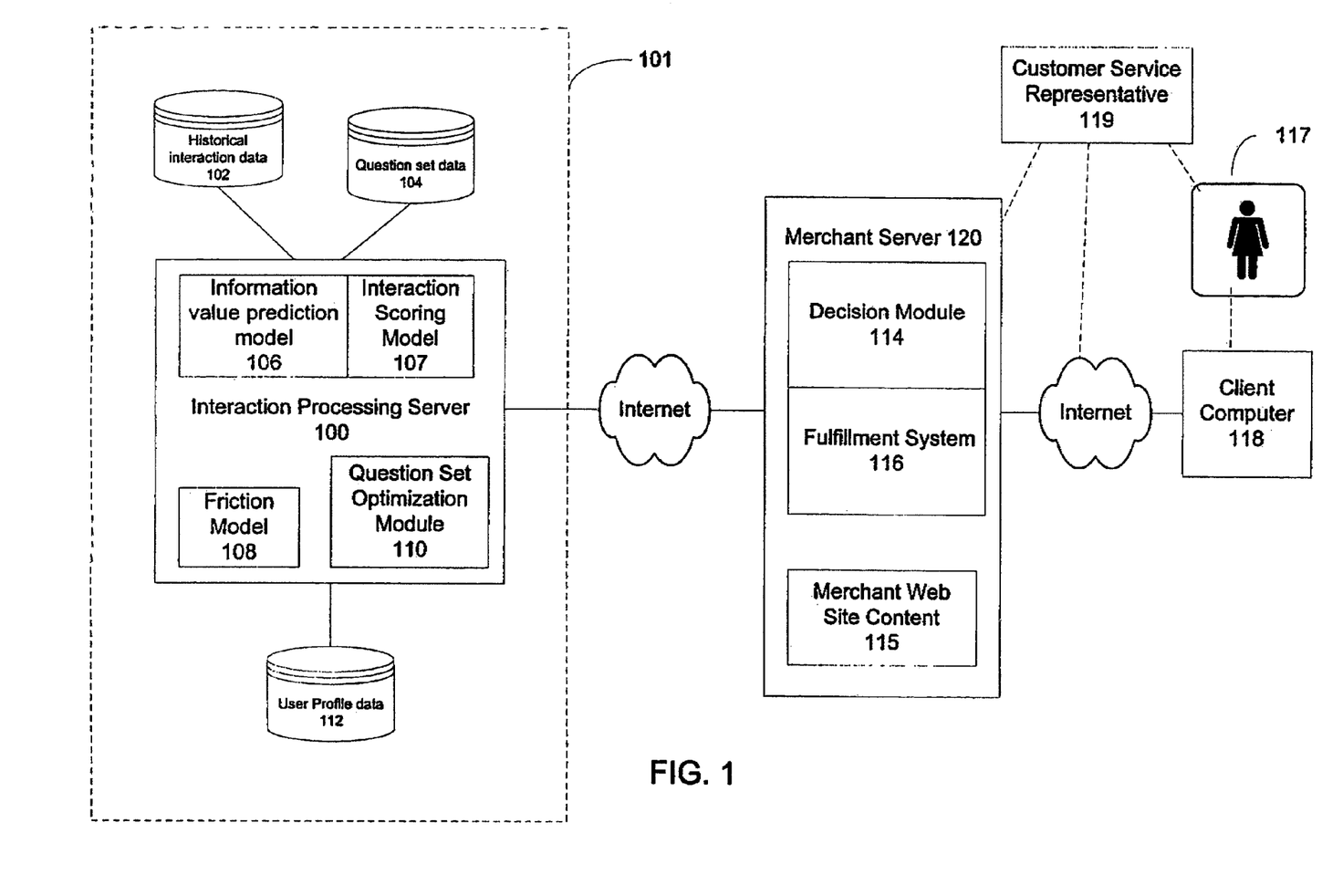
FIG. 1 is an illustration of the system architecture of one embodiment of the present invention.

Referring now to FIG. 1, there is shown a system 101 in accordance with one embodiment of the invention. This embodiment operates in the context of a merchant doing business through the Internet or other network. However, as noted above, the invention contemplates entity/user or merchant/customer interactions where communication with the user/customer can occur over media other than a computer network or can occur through a customer service representative 119. The customer service representative 119 can communicate with a customer 117 over the phone or in person. For example, a customer 117 can call into a call center, e.g., a customer service center or a phone center for ordering from a catalog. Alternatively, the merchant can contact the user through an out-bound call center, e.g., a telemarketing operation. In either case, the operators or voice response units can operate from a script that guides them as to what questions to ask and when. The script can be devised as described herein.

In the on-line merchant context, the merchant operates a merchant server 120, which provides customers with access to the merchant's web site 115. The customers access the merchant server 120 using their own client computers 118 via the Internet or other network Only one client computer 118 is shown for convenience, as those of skill in the art appreciate the general client-server operation of the internet.

More specifically, the merchant server 120 may be characterized as including a fulfillment system 116 and a decision module 114. The fulfillment system 116 interfaces with the client computer 118 to provide access to the merchant's inventory, to determine which items are available in stock, to gather information from the customer related to the transaction, and to otherwise handle the fulfillment of the customer's request.

Figure 6:
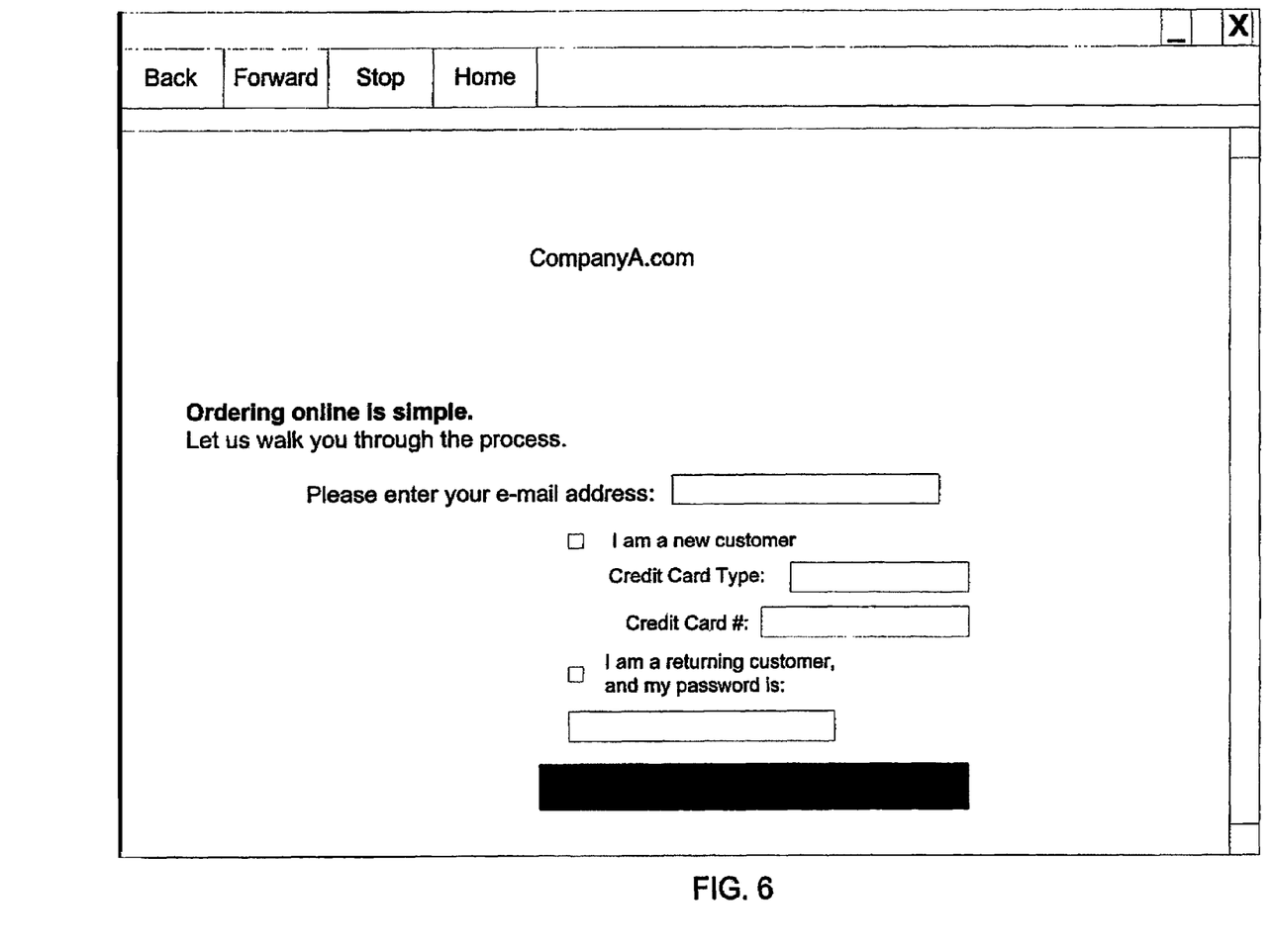
FIG. 6 shows a first form sent to a client's browser by the system of FIG. 1 in response to a request for a transaction.

Thus, from a client computer 118, a customer typically browses or searches the merchant's website 115 prior to selecting a product for purchase. The customer then submits a purchase request for a selected product and the fulfillment system 116 handles the request. A purchase request is one form of a requested interaction by a user with an entity. Typically, the fulfillment system 116 gathers some initial information regarding the transaction. With reference to FIG. 6, the merchant server 120 can send the client computer an initial form to collect a limited amount of data. In one embodiment, the initial form collects the minimal amount of information necessary to fulfill the order, e.g., credit card type, credit card account number, and customer name. The accumulated initial information may include the amount of the transaction, credit card type, credit card number, customer name, or other information the merchant deems desirable. Thus, the request includes a first set of interaction data for variables descriptive of the interaction.

Once the merchant server 120 obtains initial data sufficient to process the client's requested transaction, the merchant server 120 forwards the initial data to the interaction-processing server 100. In one embodiment, the interaction-processing server runs the transaction-scoring model 107 to provide a fraud score for the requested transaction. The transaction-scoring model and its operation are described in U.S. Pat. No. 5,819,226, entitled "Fraud Detection Using Predictive Modeling" and incorporated herein by reference in its entirety.

Interaction-processing server 100 provides the merchant with an evaluation of the initial information that allows the merchant to decide whether or not to complete the transaction. In the preferred embodiment, it provides an evaluation of the likelihood that the transaction is fraudulent. This likelihood of fraud evaluation lets the merchant decide, essentially in real time, whether to complete the transaction, decline to complete the transaction, or to request additional information from the customer.

More particularly, in the illustrated embodiment, the interaction processing system 101 includes an interaction-processing server 100, which in turn includes an interaction-scoring model 107, an information value prediction model 106, a friction model 108, and an optimization module 110. The interaction-processing server 100 is in communication with historical interaction data 102, user profile data 112, and question set data 104.

The interaction-scoring model 107 is a statistical model that predicts (classifies) a characteristic of the transaction based on the initial transaction data received from the merchant server 120. In an embodiment where the concern of the merchant is credit card fraud, the interaction scoring model 107 is a fraud prediction model that estimates (scores) a transaction with a transaction score (e.g. fraud score) indicative of the likelihood that the transaction is fraudulent, based on the initial transaction information.

As noted, the interaction-scoring model is not limited to evaluating the likelihood of fraud. Other characteristics of an interaction may likewise be scored or classified. For example, the system can score the likelihood 1) that a client will provide an honest response, 2) that a client is a good credit risk, for example, in the context of a loan application, or 3) that a client will make a good research subject.

The interaction-processing server 100 returns the transaction score to the merchant server 120. The decision module 114 receives the transaction score and evaluates the score with various criteria or filters that can be selected by the merchant. Typically, the merchant selects two thresholds, e.g., UpperBound and LowerBound. Transactions with transaction scores below LowerBound are automatically fulfilled; transactions with transaction scores above UpperBound are automatically declined, assuming that the system 101 is designed to have a high score indicate an undesirable transaction. Obviously, the system can be designed to use a low score to indicate an undesirable transaction.

To maximize the merchant's revenue, it is desirable for the merchant to fulfil at least some of the transactions scored between LowerBound and UpperBound. To do so requires that additional information be acquired from the customer. However, experience has shown that when more information is requested, a customer is often more likely to terminate (attrite) the transaction, thereby resulting in a lost sale. This is just one aspect of the phenomenon of "abandoned shopping carts" that on-line merchants face. Thus, the system aids a merchant in selectively requesting additional data about a user in such a way that the likelihood of the user terminating the transaction is reduced.

In other words, a system according to the invention allows a merchant to request additional information from selected customers, e.g., customers with fraud scores above a threshold level. In addition, the system can help a merchant to evaluate the value of additional information versus the annoyance suffered by the customer in providing the additional information. Merchants may want to collect information about customers either for purposes directly related to the transaction, e.g., to reduce the likelihood of fraud, or unrelated to the transaction, e.g., for marketing and demographic analysis.

Returning to FIG. 1, in one embodiment, the interaction-processing server 100 performs fraud estimation using a statistical model of fraudulent transactions. An interaction processing system 101 contains historical interaction data, e.g., historical transaction data, to enable the creation of an interaction-scoring model 107. The historical data contains the same types of information that merchants, in the operational system, transmit to the interaction-processing server 100 for each interaction, e.g., transaction. In addition, the historical data is tagged to identify which transactions are subsequently proved to have been legitimate, and which transactions are subsequently proved to have been fraudulent.

One embodiment of the system uses historical data to create buyer profiles. The system stores the buyer profiles in the form of user profile data 112. The system creates a buyer profile for each buyer who conducts a transaction with an Internet merchant connected to the system. A multi-keyed algorithm associates various transactions with respective buyers. U.S. patent application Ser. No. 60/195,156, filed Apr. 6, 2000, entitled "Identification And Management Of Fraudulent Credit/Debit Card Purchases At Merchant Ecommerce Sites," and incorporated herein by reference in its entirety, describes the multi-keyed algorithm. The multi-keyed algorithm accumulates and profiles transactional information with respect to different keys that can be used to identify a buyer.

Each buyer's profile contains information summarizing transactions by the buyer including transactions the buyer has executed over the Internet with merchants connected to the system. The profile includes information typifying those transactions, e.g., typical amounts, type of purchase, type of merchant, and hour of the day. A system according to one embodiment of the invention can develop a statistical model that, based on historical interaction data, estimates (scores) the likelihood of fraud in a particular transaction given the information associated with the transaction as well as the profile of the buyer in that transaction. In other words, the user profile data 112 includes a customer history database that keeps record of prior customer transactions. The database can include statistics as to transaction performance such as average purchase amount or percent of purchases made in a particular geographic area.

Figure 2:
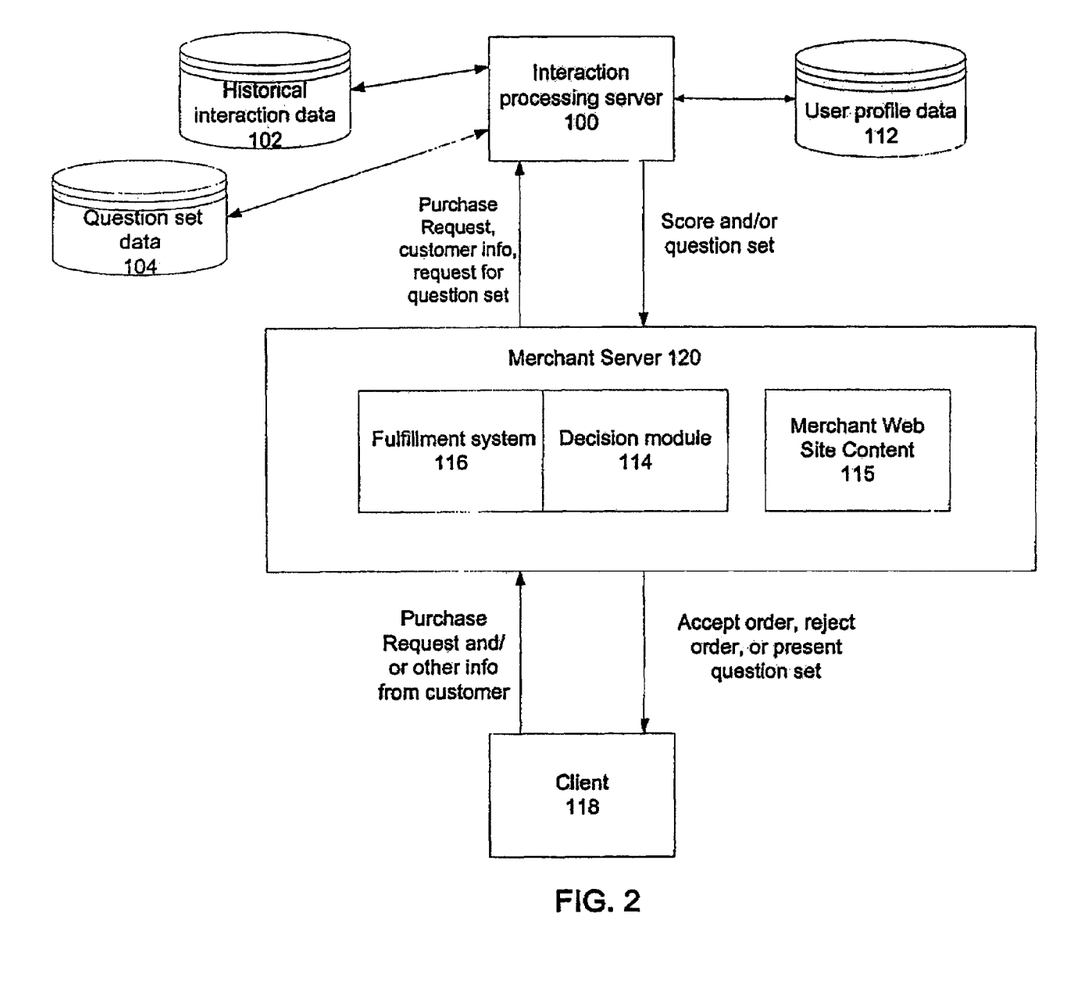
FIG. 2 is a flow chart for operation of one embodiment of the system of FIG. 1.
Figure 3:
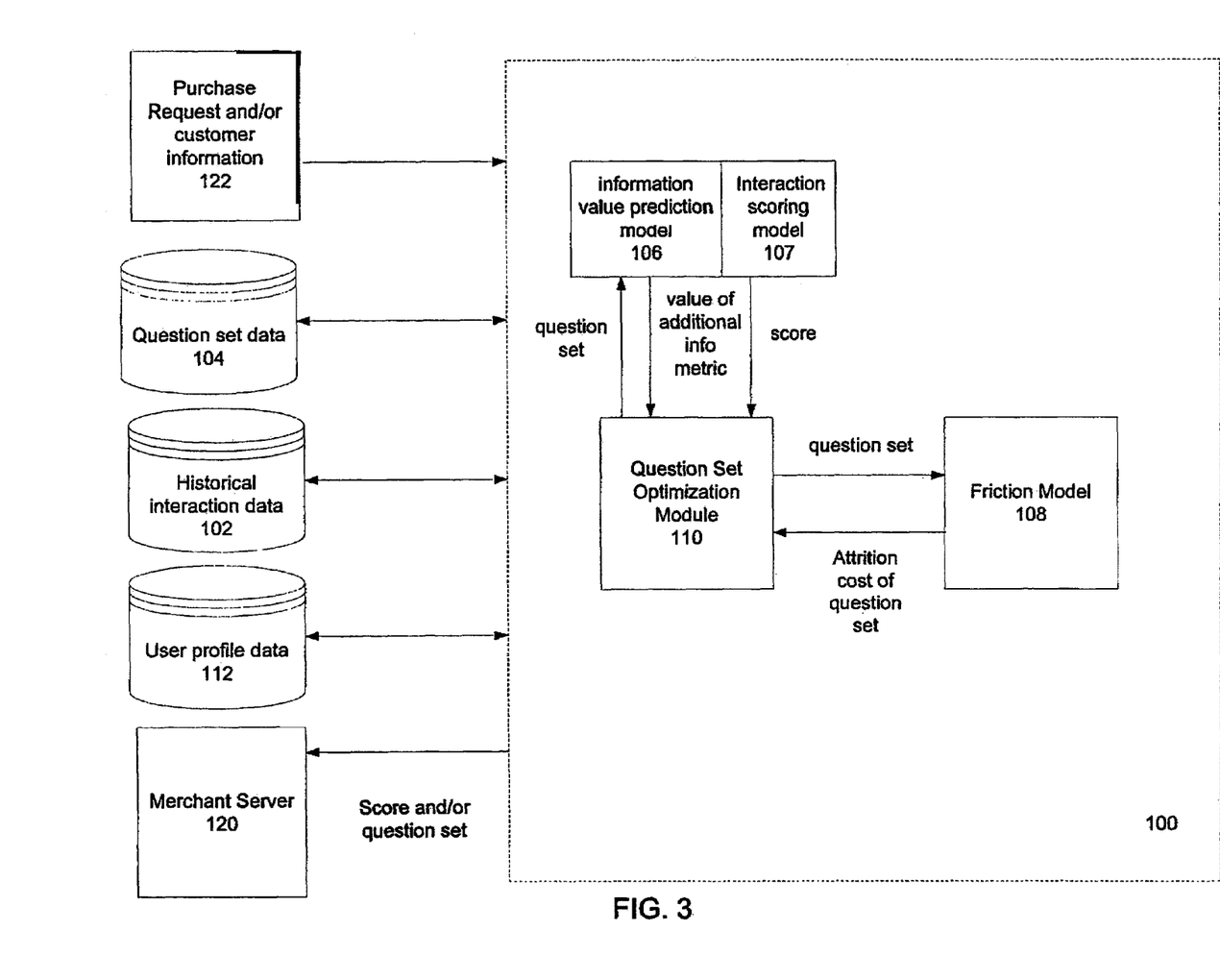
FIG. 3 is a flow chart for operation of one embodiment of the interaction-processing server of FIG. 1.
Figure 4:
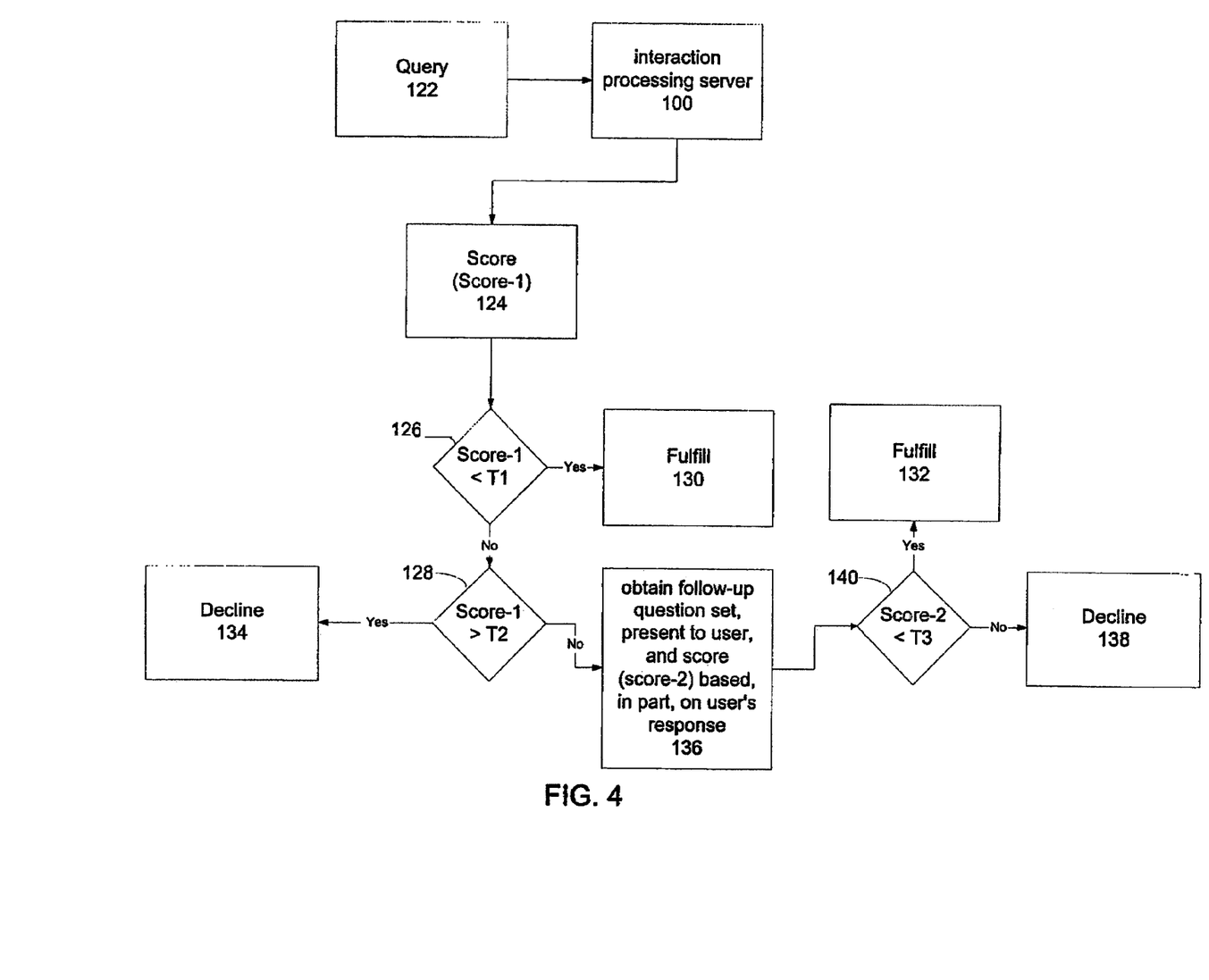
FIG. 4 is flow chart for the operation of one embodiment of the decision module of FIG. 1.

With reference to FIGS. 2 and 4, once the interaction-scoring model 107 has determined an interaction score 124, the interaction-processing server 100 sends a first score, score-1, to the decision module 114 in the merchant server 120. Given score-1, one embodiment of the decision module 114 determines 126 whether the score is less than a LowerBound T1. If the score is below LowerBound T1, the decision module indicates to the fulfillment system 116 to proceed with the request for an interaction, e.g., a purchase request. If the score is equal to or above LowerBound T1, the decision module determines 128 whether the score is above an UpperBound, T2, where T2 is greater than T1. If the score is above UpperBound T2, the decision module 114 indicates to the fulfillment system to decline 134 to fulfill the request for an interaction, e.g., to decline to fulfill the purchase request. As noted above, another embodiment can use a low score to indicate an undesirable transaction.

Figure 5:
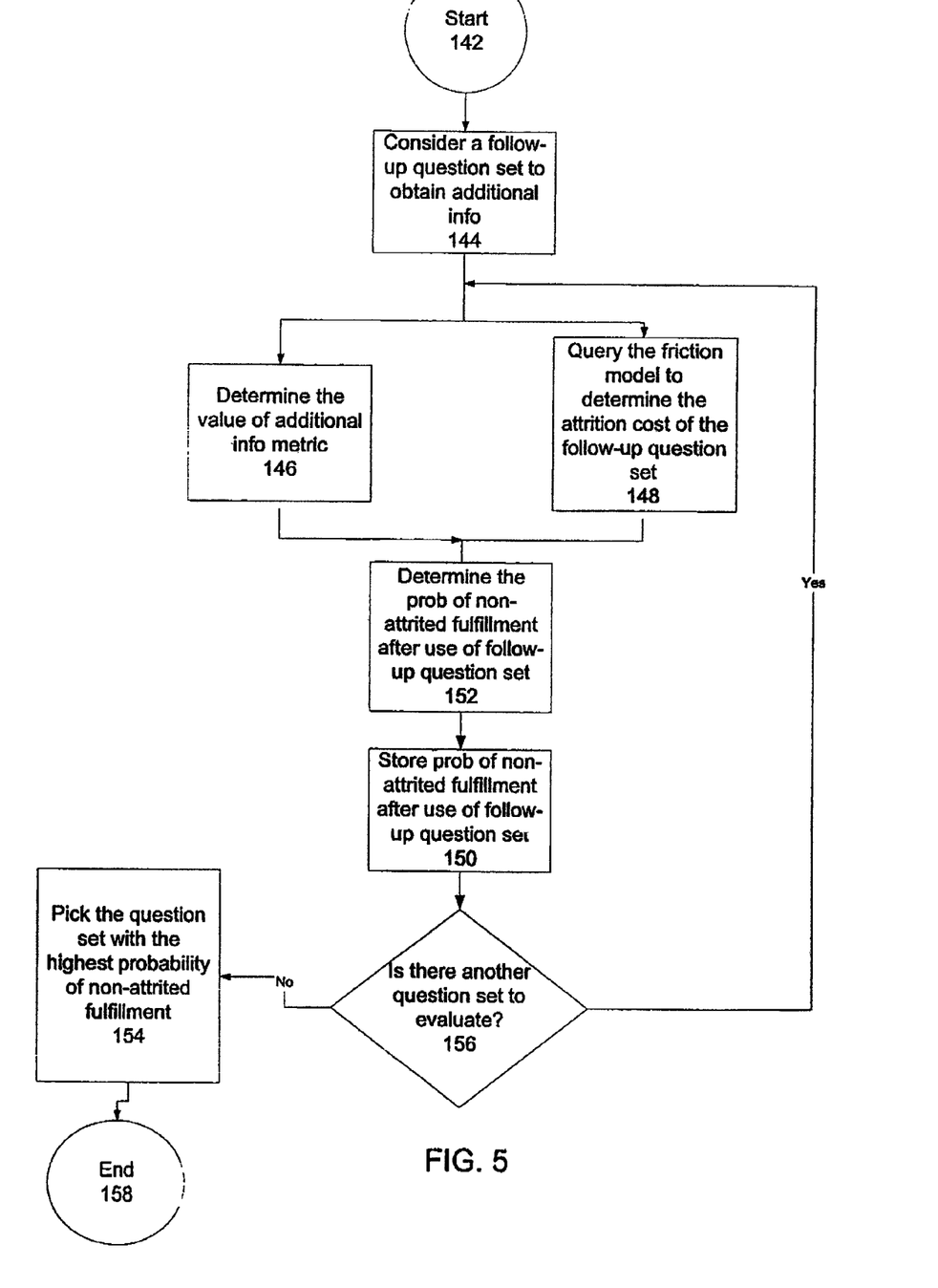
FIG. 5 is a flow chart for the operation of one embodiment of the question set optimization module of FIG. 2.

In the illustrated embodiment, if the score is between LowerBound T1 and UpperBound T2 inclusive, the decision module 114 sends a request to the interaction-processing-server 100 to obtain 136 a follow-up question set. With reference to FIG. 5, there is shown a flowchart of one process for obtaining additional information. The interaction-processing server obtains 144 data representing a plurality of follow-up question sets from question set data. A question set can contain one or more questions. The question set optimization module then determines the expected value of fulfillment for the selected plurality of question sets and selects a question set with a high expected value of fulfillment.

In a preferred embodiment, the information value prediction model uses the information obtained to create the fraud score to determines 146 the value of the missing information represented by the question set. In addition, a friction model, using similar information to that obtained by the transaction-scoring model, determines 148 the attrition cost of the question set. An attrition cost is a measure of the likelihood that presenting a question set to a user will cause that user to terminate the interaction.

The question set optimization module receives the value of the missing information and the attrition cost. Based on this information, the question set optimization module determines 152 the probability of non-attrited fulfillment after use of the question set and stores 150 the probability. In one embodiment, the probability of non-attrited fulfillment is the probability of non-attrition multiplied by the value of the missing information, i.e., the information value metric. The value of the additional information, i.e., the information value metric, can represent the probability that the interaction value will cross a specified threshold if the interaction value is based on data that includes a response to the follow-up question set.

The optimization module then determines 156 if there is another question set to evaluate. If there is another question set, the optimization module repeats the process 146, 148, 150, 152 outlined above for the next follow-up question set. The system repeats this process for all candidate question sets. Finally, the optimization module selects 154 the question set with the highest probability of non-attrited fulfillment and returns data representing the selected question set to the merchant server.

Figure 5A:
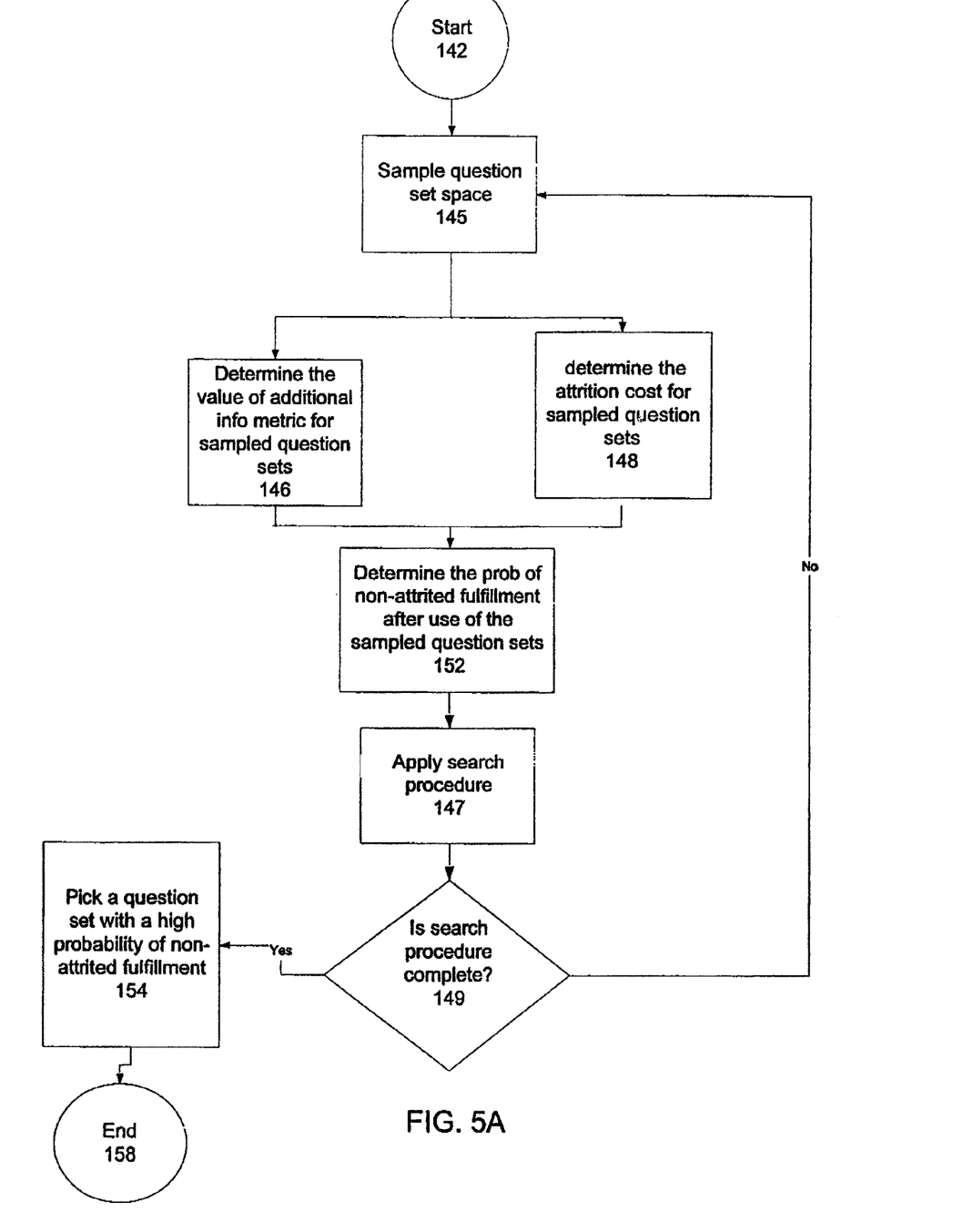
FIG. 5A is a flow chart for the operation of an alternative embodiment of the question set optimization module of FIG. 2.

With reference to FIG. 5A, there is shown a flowchart for another process for obtaining information. The interaction-processing server samples 145 the question set space derived from the question set data. Using information obtained to create the fraud score, the information value prediction model then determines 146 the value of the missing information represented by the sampled question sets. In addition, a friction model, using similar information to that obtained by the transaction-scoring model, determines 148 the attrition cost of the sampled question seta.

A question set optimization module receives the value of the missing information and the attrition cost. Based on this information, the question set optimization module determines 152 the probability of non-attrited fulfillment after use of the question set and stores the probability. More generally, based on this information, the question set optimization module can determine the expected value of fulfillment. The optimization module can then apply a search procedure 147 using the results provided by the sampled question sets, to search for a question set that provides a high expected value of fulfillment. The search procedure can use methods known to those of skill in the art such as steepest decent or greedy algorithm methods to search for a question set that meets specified search criteria without evaluating every possible combination of candidate questions.

If the search is successful based on the previously sampled question sets, e.g., if a question set meets specified search criteria, the optimization module selects that question set. If the search is unsuccessful based on the previously sampled question sets, the search procedure selects more question sets from the question set space and the interaction-processing server repeats steps 146, 148, 152, and 147.

Figure 7:
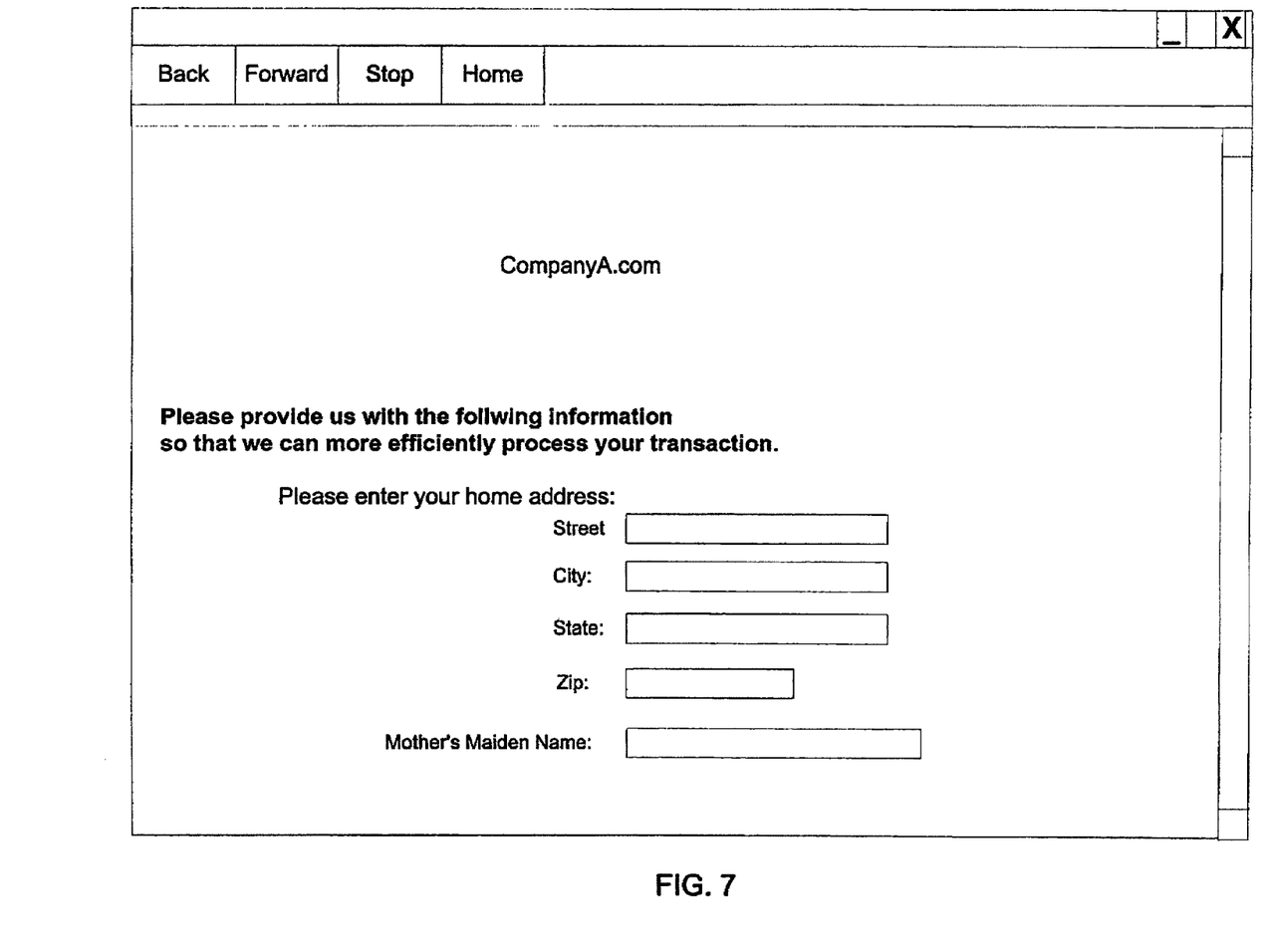
FIG. 7 shows a second form selectively sent to a client's browser by the system of FIG. 1.

The merchant server 120, in turn, forwards the selected question set to the client computer 118. FIG. 7 illustrates a selected question set embedded in a form that a merchant server 120 can send to a client computer 118. This question set is requesting a customer's home address including street, city, state, and zip code, and the maiden name of the customer's mother. The follow-up question set is sent only to a customer who has scored between a LowerBound and an UpperBound, inclusive. Thus, the majority of customers are not bothered with a follow-up question set. Furthermore, the follow-up question set illustrated in FIG. 7 is chosen for the customer so as to increase the likelihood of non-attrited fulfillment.

With reference again to FIGS. 2 and 4, upon receiving the customer's response to the follow up question set, the merchant server 120 forwards the additional information to the interaction processing system 101. The system 101 rescores the requested transaction and sends the revised score, score-2, to the decision module 114. In one embodiment, if the revised score is below a MiddleBound, T3, the module 114 indicates to the fulfillment system 116 to fulfill 132 the request. If the revised score is not below MiddleBound T3, the module indicates to the fulfillment system to decline 138 to fulfill the request. The following table summarizes the decision module outcomes as a function of score.

|  | S < LB | LB < S < Mid | Mid < S < UB | UB < S |
|---|---|---|---|---|
| 1st score | fulfill | NA | NA | reject |
| 2nd score | fulfill | fulfill | reject | reject | where LB=LowerBound, Mid=MiddleBound, UB=UpperBound, and NA=not applicable.

In a second embodiment, if the revised score is greater than MiddleBound T3, the system can obtain and forward to the customer yet another follow-up question set. In a third embodiment, the decision module 114 can take into account the value of the transaction. If, upon receipt of the customer's response to the follow-up question set, the score is greater than MiddleBound T3 and yet the value of the transaction is above a specified level, the decision module 114 may indicate to the fulfillment system 116 that human intervention is warranted. Human intervention can take a variety of forms including review by a manager or a telephone call by a service representative.

Figure 4A:
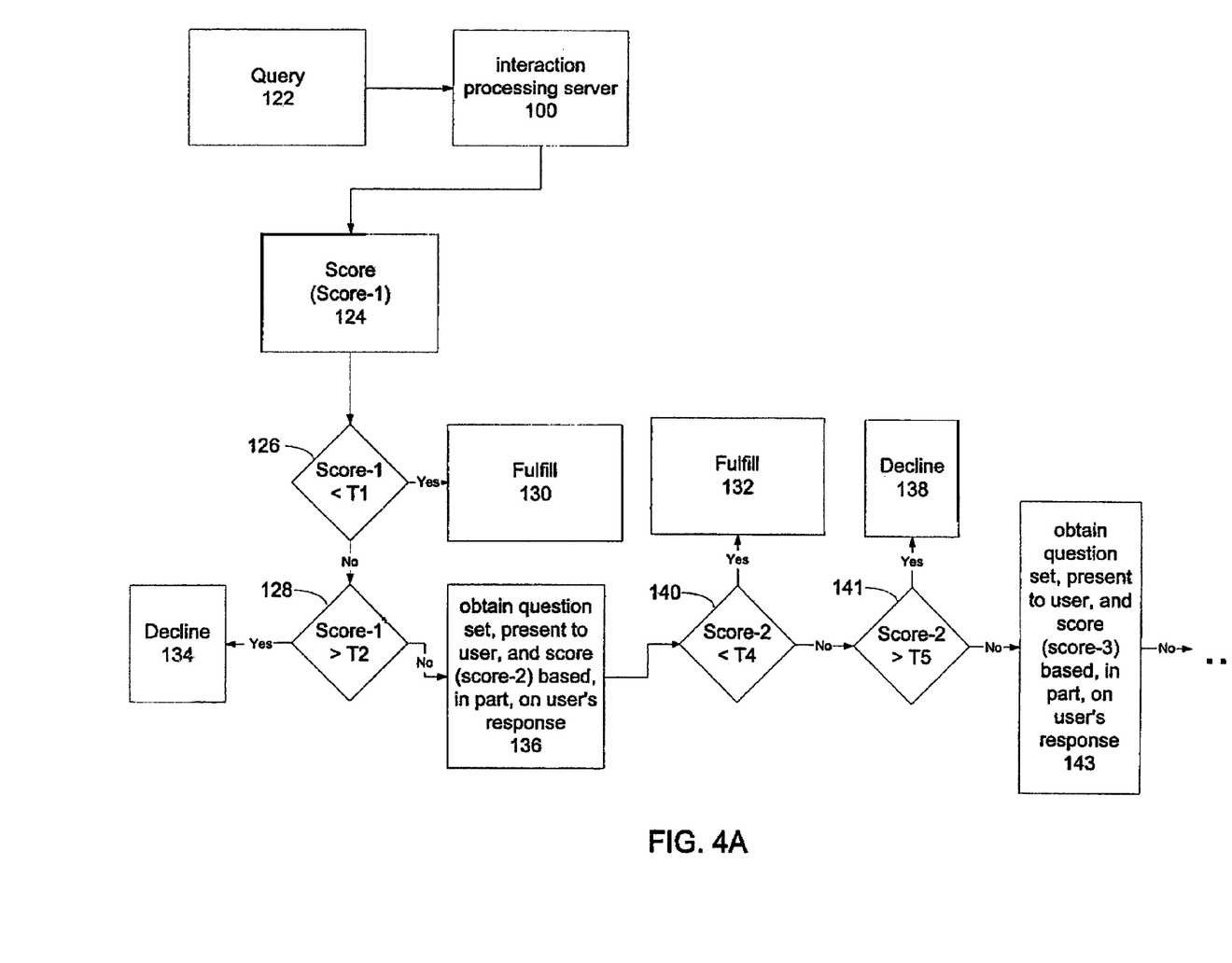
FIG. 4A is a flow chart for the operation of an alternative embodiment of the decision module of FIG. 1.

With reference to FIG. 4A, a fourth embodiment is similar to the first embodiment illustrated in FIG. 4 up to step 136. Once the system has presented a question to a user and the interaction-processing server has calculated a second score, score-2, based on the additional data, the decision module then determines if score-2 is lower than LowerBound T4. If score-2 is lower than T4, the decision module proceeds with the interaction. If score-2 is not less than T4, the decision module determines if score-2 is greater than UpperBound T5, where T4 is less than T5. If score-2 is greater than T5, the decision module declines 138 to proceed with the interaction. If score-2 is between T4 and T5 inclusive, the system can iteratively repeat the process of steps 136, 140, and 141.

The information value prediction model 106 can exist in a variety of embodiments. In one embodiment, each question set has an average value. The model 106 can be trained by taking a large set of transactions and by scoring the likelihood of fraud of each transaction with and without the information provided by a particular question set. The model obtains the difference between scores with and without information provided by a particular question set and averages the distances over the set of transactions to obtain a measure of the value of the information provided by a particular question set. This process is repeated for each question set.

In another embodiment, the model 106 determines the value of the question set based on both the information provided by the question set and based on transaction information. The model 106 is trained by taking broad categories of transactions, e.g., by amount and SIC codes, and for each of these categories, scoring each transaction with and without question set information to determine the average difference in score. In segmenting the transactions into categories, it is preferable if each category has statistical robustness, i.e., each category has a statistically large number of transactions.

In still another embodiment, the model 106 determines the value of the question set based on the information provided by the question set, transaction information, and the user's profile. The model 106 is trained by using all the information that is used to score the transaction. Again, each transaction is scored with and without question set information to allow the model to determine the value of the question set information.

Similarly, the friction model 108 can exist in a variety of embodiments. In one embodiment, each question set has a fixed percentage of attrition given presentation of the question set to users. In another embodiment, the friction model 108 is fixed with respect to consumers and variable relative to transaction attributes. In other words, the friction model 108 is trained by segmenting the transaction space into categories and the attrition rates are then determined within the transaction categories. Thus, if a merchant has two transaction categories, specialty electronics and consumer electronics, the friction model 108 is trained by segmenting all transactions that involve specialty electronics into a separate category from all transactions that involve consumer electronics. The attrition rate for a particular question set is determined specifically for each category, i.e., an attrition rate for specialty electronics customers and an attrition rate for consumer electronics customers.

Still another embodiment of the friction model 108 determines attrition rates based on the question set, consumer attributes, and transaction attributes. In this embodiment, not only are the transactions broken down by category, but also by attributes of the customer. Thus, a segment of the transactions may involve specialty electronics customers living in the United States, and another segment of the transactions may involve specialty electronics customers living outside the United States.

Both the information value prediction model 106 and the friction model 108 are not limited to being predictive models. Rather these models 106 and 018 can use any of a variety of methodologies known to those of skill in the art to estimate the value of additional data provided by a question set and the attrition costs associated with a question set, respectively. For example, either model 106 or model 108 or both can be exert-rule coded.

Credit card transactions are only one application of the invention. The invention can apply to other situations in which an entity wants to obtain information from its users while fostering the entity/user interaction. Thus, the invention relates to situations in which an entity wants to collect information from a user for a variety of reasons distinct from processing on-line transactions. These reasons can include gathering information for marketing or for research. Entities often use registration forms for such purposes. Completion of the registration form is often a prerequisite for gaining access to portions of a site or to desirable content. Entities that control such sites or desirable content do not want to cause the user to terminate her interaction with the entity, to provide false or incomplete information, or to develop ill will toward the entity. Thus, the invention assists such entities in determining the conditions under which to request information from a user without causing the user to have an adverse reaction.

In one preferred embodiment, a system according to the invention applies the optimization methodology represented by FIGS. 4, 4A, 5, and 5A in determining the initial question set presented to a user or customer as well as in determining one or more follow-up question sets if necessary. In other words, the system can select an initial question set based on a cost/benefit analysis of presenting different question sets. As noted above, the cost/benefit analysis takes into account the value of the information provided by the question set and the attrition cost of the question set.

As can be seen from the foregoing, the interaction processing system 101 and the decision module 114 allow a fulfillment system 116 to selectively obtain additional information from a user so as to meet the needs of an entity. At the initial stage of a user-entity interaction, the interaction processing system 101 can provide an interaction score. The decision module can use the interaction score to make decisions about the interaction. If the decision module indicates that more information is needed to make a decision about the interaction, the interaction-processing system can derive a question from question set data that has a high probability of leading to non-attrited fulfillment or more generally to a high expected value of fulfillment.

As will be understood by those familiar with the art, the invention may be embodied in other specific forms without departing from the spirit or essential characteristics thereof. For example, interaction-scoring model 107 can score a variety of interactions in addition to a transaction involving the purchase of goods or services. The system may be used in other than retail environments; it may be used in any environment where it is desirable to provide customized forms or question sets for gathering information. Likewise, the particular naming of the features, attributes, data structures, rules or any other aspect is not mandatory or significant, and the mechanisms that implement the invention or its features may have different names or formats. Accordingly, the disclosure of the present invention is intended to be illustrative, but not limiting of the scope of the invention, which is set forth in the following claims.

The invention claimed is:

1. A computer-implemented method for processing a request for an interaction over a computer network, the method being implemented by one or more data processors and comprising:
   receiving, by at least one data processor, a request for an interaction from a user, the request including a first set of interaction data for variables descriptive of the interaction;
   determining, by at least one data processor, a value of the interaction based on the first set of interaction data; and
   responsive to the value of the interaction, performing, by at least one processor:
      terminating the interaction if the value is at or above a first threshold;
      proceeding with the request for an interaction if the value is at or below a second threshold; and
      obtaining additional data from the user in order to facilitate the determination of whether to proceed with the interaction if the value is between the first threshold and the second threshold by:
         determining, by at least one data processor for each of a plurality of follow-up question sets, a probability of non-attrited fulfillment after use of the follow-up question set based on a metric of the value of additional data and on a likelihood that the user will terminate the interaction if the user is presented the follow-up question set, and
         presenting, by at least one data processor to the user, the follow-up question set with the greatest probability of non-attrited fulfillment.

2. The computer-implemented method of claim 1, wherein receiving a request for an interaction comprises:
   generating and forwarding, by at least one data processor, to a user's computer, by at least one data processor, a form for obtaining the first set of interaction data.

3. The computer-implemented method of claim 1, wherein receiving a request for an interaction from a user comprises:
   determining, by at least one data processor for each of a plurality of question sets, a probability of non-attrited fulfillment after use of the question set based on a metric of the value of data provided by the question set and on a likelihood that the user will terminate the interaction if the user is presented the follow-up question set; and
   presenting, by at least one data processor, to the user the question set with the greatest probability of non-attrited fulfillment.

4. The computer-implemented method of claim 1, wherein the additional data is obtained and obtaining additional data comprises:
   generating and forwarding, by at least one data processor, a request for additional data to a user's computer.

5. The computer-implemented method of claim 4, wherein generating and forwarding a request for additional data comprises generating and forwarding, by at least one data processor, to a user's computer a form for obtaining additional data.

6. The computer-implemented method of claim 1, wherein the additional data is obtained and obtaining additional data comprises:
   determining, by at least one data processor for each of a plurality of follow-up question sets, an expected value of fulfillment after use of the follow-up question set; and
   presenting, by at least one data processor, to the user a follow-up question set having at least a preselected expected value of fulfillment.

7. The computer-implemented method of claim 6, wherein determining an expected value of fulfillment is a function of at least one of: the value of additional data; the likelihood that the user will terminate the interaction if the user is presented the follow-up question set; and the monetary value of the transaction.

8. The computer-implemented method of claim 1, wherein the additional data is obtained and obtaining additional data further comprises prior to determining a probability of non-attrited fulfillment:
   calculating, by at least one data processor for each of a plurality of follow-up question sets, a metric for the value of additional data provided by a follow-up question set; and
   determining, by at least one data processor for each of a plurality of follow-up question sets, the likelihood that the user will terminate the interaction if the user is presented with the follow-up question set.

9. The computer-implemented method of claim 1, wherein the method further comprises:
   obtaining, by at least one data processor, a second set of interaction data in response to the follow-up question set;
   determining, by at least one data processor, a revised value of the interaction based on data including the second set of interaction data; and
   responsive to the revised value of the interaction, terminating, by at least one data processor, the interaction or fulfilling the request for an interaction.

10. The computer-implemented method of claim 1, wherein the probability of non-attrited fulfillment is a function of the probability of non-attrition after presentment of the follow-up question set and a function of the probability that the interaction value will exceed a threshold if the interaction value is based on data that includes data provided in response to the follow-up question set.

11. The computer-implemented method of claim 1, wherein the additional data is obtained and obtaining additional data comprises:
   determining, by at least one data processor, a probability of non-attrited fulfillment after presentment of a follow-up question set based on a metric for the value of additional data provided by the follow-up question set and based on a likelihood that the user will terminate the interaction once presented with the follow-up question set.

12. The computer-implemented method of claim 11, further comprising:
calculating, by at least one data processor, a metric for the value of additional data provided by a follow-up question set by applying data representing the follow-up question set and the initial interaction data to a predictive metric model.

13. The computer-implemented method of claim 11, wherein calculating a metric for the value of additional data provided by a follow-up question set comprises:
applying, by at least one data processor, data representing the follow-up question set, initial interaction data, and user data to a predictive metric model.

14. The computer-implemented method of claim 11, wherein determining the probability of non-attrited fulfillment after presentment comprises:
applying, by at least one data processor, the follow-up question set and the initial interaction data to a predictive friction model, the predictive friction model derived from pre-processing past interaction data for a plurality of users to derive past attrition related variables, the past interaction data including variables descriptive of a past interaction and at least one variable descriptive of whether the interaction was attrited.

15. The computer-implemented method of claim 11, further comprising:
calculating, by at least one data processor, a metric for the value of additional data provided by a follow-up question set by applying data representing the follow-up question set to a predictive metric model.

16. The computer-implemented method of claim 15, wherein the predictive metric model is trained by:
(a) scoring, by at least one data processor, a set of transactions with and without data provided by a follow up question set;
(b) determining, by at least one data processor, the difference in scores with and without the data provided by the follow-up question set; and
(c) training, by at least one data processor, the predictive metric model based on the difference in scores.

17. The computer-implemented method of claim 15, wherein the predictive metric model is trained by:
(a) obtaining, by at least one data processor, data for a set of transactions that have at least a specified transaction score;
(b) scoring, by at least one data processor, the set of transactions without data provided by a follow-up question set; and
(c) calculating, by at least one data processor, a metric for the value of additional data provided by a follow-up question set based on the likelihood that the data provided by the follow-up question set will move a score for a transaction past a specified transaction score.

18. A system for processing a request for an interaction over a computer network, the system comprising:
one or more data processors;
memory for storing instructions, which when executed by at least one data processor, result in operations comprising:
receiving a request for an interaction from a user, the request including a first set of interaction data for variables descriptive of the interaction;
determining a value of the interaction based on the first set of interaction data; and
responsive to the value of the interaction, performing:
terminating the interaction if the value is at or above a first threshold;
proceeding with the request for an interaction if the value is at or below a second threshold; and
obtaining additional data from the user in order to facilitate the determination of whether to proceed with the interaction if the value is between the first threshold and the second threshold by:
determining, for each of a plurality of follow-up question sets, a probability of non-attrited fulfillment after use of the follow-up question set based on a metric of the value of additional data and on a likelihood that the user will terminate the interaction if the user is presented the follow-up question set, and
presenting to the user the follow-up question set with the greatest probability of non-attrited fulfillment.

19. A system for processing a request for an interaction over a computer network, the system comprising:
means for receiving a request for an interaction from a user, the request including a first set of interaction data for variables descriptive of the interaction;
means for determining a value of the interaction based on the first set of interaction data; and
means, responsive to the value of the interaction, for performing:
terminating the interaction if the value is at or above a first threshold;
proceeding with the request for an interaction if the value is at or below a second threshold; and
obtaining additional data from the user in order to facilitate the determination of whether to proceed with the interaction if the value is between the first threshold and the second threshold by:
determining, for each of a plurality of follow-up question sets, a probability of non-attrited fulfillment after use of the follow-up question set based on a metric of the value of additional data and on a likelihood that the user will terminate the interaction if the user is presented the follow-up question set, and
presenting to the user the follow-up question set with the greatest probability of non-attrited fulfillment.

* * * * *

UNITED STATES PATENT AND TRADEMARK OFFICE
CERTIFICATE OF CORRECTION

| | | |
|---|---|---|
| PATENT NO. | : 8,175,897 B2 | Page 1 of 1 |
| APPLICATION NO. | : 11/738362 | |
| DATED | : May 8, 2012 | |
| INVENTOR(S) | : Lee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1378 days.

Signed and Sealed this

Eleventh Day of September, 2012

David J. Kappos
*Director of the United States Patent and Trademark Office*